G. P. BUTLER.
EXPANSIBLE BIT.
APPLICATION FILED JULY 23, 1909.
970,789.
Patented Sept. 20, 1910.
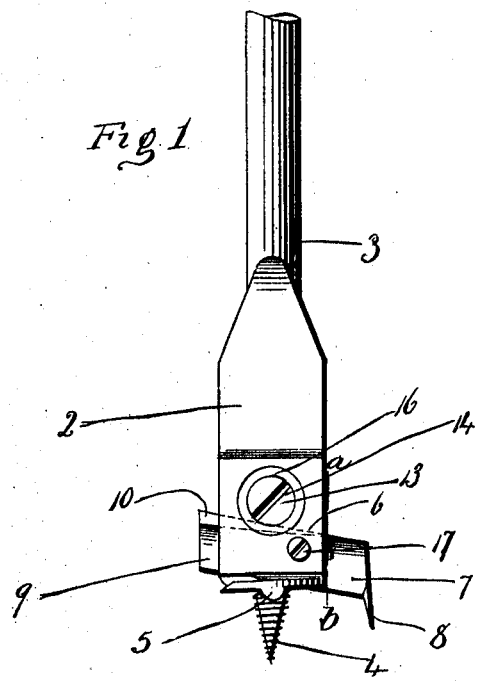
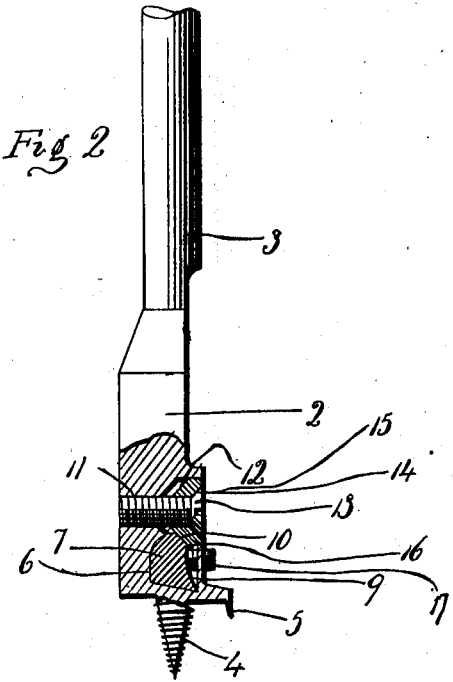
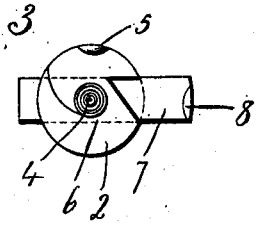
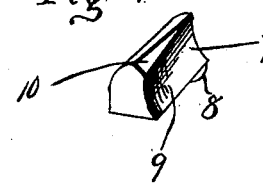
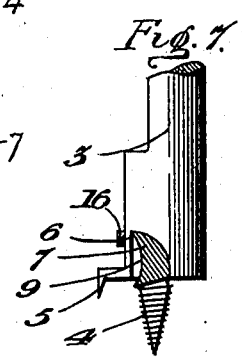
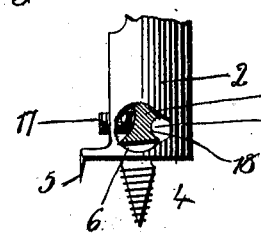

UNITED STATES PATENT OFFICE.

GEORGE P. BUTLER, OF NEW HAVEN, CONNECTICUT.

EXPANSIBLE BIT.

970,789. Specification of Letters Patent. Patented Sept. 20, 1910.

Application filed July 23, 1909. Serial No. 509,124.

*To all whom it may concern:*

Be it known that I, GEORGE P. BUTLER, a citizen of the United States, residing at New Haven, in the county of New Haven and State of Connecticut, have invented a new and useful Improvement in Expansible Bits; and I do hereby declare the following, when taken in connection with the accompanying drawings and the letters of reference marked thereon, to be a full, clear, and exact description of the same, and which said drawings constitute part of this specification, and represent, in—

Figure 1 a face view of an expansible bit embodying my invention. Fig. 2 a side view of the same partially in section. Fig. 3 an end view. Fig. 4 a perspective view of the cutter, detached. Fig. 5 a side view partially in section showing a modified form of my invention. Fig. 6 a perspective view of the cutter for the same. Fig. 7 a sectional view on the line *a—b* of Fig. 1.

This invention relates to an improvement in expansible bits, and particularly to those which comprise a solid head in which an adjustable cutter is clamped in contradistinction to bits in which a clamping plate is arranged on one side of the head to clamp the cutter, the object of the invention being the cheap construction of a strong bit which permits the ready adjustment of the cutter, yet securely holds the same in place; and the invention consists in the construction hereinafter described and particularly recited in the claims.

The head 2 of the cutter is formed integral with a shank 3 and is provided with the usual gimlet point 4 and scoring lip 5. Extending transversely through the head but slightly inclined from the horizontal, is a hole 6 preferably non-cylindrical and intersecting or cutting through the outer end of the head 2 at one side of the point 4 substantially opposite the cutting edge of the scoring lip 5. Entered into this hole is an adjustable cutter 7, the cutter being formed from a steel rod corresponding in dimensions to the dimensions of the hole 6, and of a length according to the diameter of the hole to be cut. These cutters are formed with the usual spur 8, and with two oppositely inclined surfaces. Thus the front face 9 is tapered in one direction, and the upper edge 10 is tapered in the reverse direction. Extending through the head from the front is a threaded hole 11, the face of the body having a recess 12 around the hole 11, the recess intersecting the hole 6. Into this hole 11 a screw 13 is inserted, the screw having a notched head 14 and a beveled face 15 below the head which is adapted to engage with the surface 10 of the cutter or with the washer 16 which engages with the cutter.

The cutter is adjusted to project to the desired extent from one side of the head and then the screw 13 turned in to clamp the cutter and prevent its moving longitudinally in one direction. To prevent its moving in the opposite direction a screw 17 is mounted in the front face of the head slightly to one side, and is adapted to bear against the surface 9 of the cutter to prevent its moving in the opposite direction.

Instead of forming the hole 6 non-cylindrical and the cutter of corresponding shape, the hole may be circular as shown in Fig. 5 of the drawings, and the cutter of corresponding shape as shown in Fig. 6 of the drawings. In this case some provision must be made to prevent the cutter from turning in the head, and for this purpose I provide the rear of the cutter with a longitudinal groove 18, and at one end of the hole 6 I strike the metal in to form a lug 19 which enters the groove 18 so as to prevent turning. The cutter in this case is held against longitudinal movement by the two screws in the same way as above described. By having the edge of the cutter intersect the end of the head, the edge of the cutter is near the base of the screw, consequently it will cut with greater ease and more completely, and by making it non-cylindrical the cutter is held against turning so that a more perfect cut is made.

I claim:—

1. The herein described expansible bit comprising a head having a transversely arranged inclined hole, a cutter adapted to be entered into said hole and formed on one side with oppositely inclined surfaces, and screws entered into said head and adapted to bear against said cutter.

2. The herein described expansible bit comprising a head having a transversely arranged, inclined non-cylindrical hole, a non-cylindrical cutter corresponding in dimensions to said hole and entered therein and formed on one side with oppositely inclined surfaces, and screws entered into said head and adapted to bear against said inclined surfaces.

3. The herein described expansible bit comprising a head and gimlet point, said head formed with a transversely arranged inclined hole opening through the outer or front end of the head at one side of said point, a cutter adapted to be entered into said hole and having a cutting edge which extends beyond the front end of the head, said cutter formed with oppositely inclined surfaces, and screws entered into said head and adapted to bear against said surfaces.

In testimony whereof, I have signed this specification in the presence of two subscribing witnesses.

GEORGE P. BUTLER.

Witnesses:
FREDERIC C. EARLE,
CLARA L. WEED.